(12) United States Patent
Wei et al.

(10) Patent No.: US 8,472,746 B2
(45) Date of Patent: Jun. 25, 2013

(54) FAST DEPTH MAP GENERATION FOR 2D TO 3D CONVERSION

(75) Inventors: Jianing Wei, San Jose, CA (US); Xue Tu, San Jose, CA (US); Xiaoling Wang, San Jose, CA (US); Alexander Berestov, San Jose, CA (US)

(73) Assignee: Sony Corporation, Tokyo (JP)

( * ) Notice: Subject to any disclaimer, the term of this patent is extended or adjusted under 35 U.S.C. 154(b) by 260 days.

(21) Appl. No.: 13/042,182

(22) Filed: Mar. 7, 2011

(65) Prior Publication Data

US 2011/0188773 A1     Aug. 4, 2011

Related U.S. Application Data

(63) Continuation-in-part of application No. 13/019,640, filed on Feb. 2, 2011.

(60) Provisional application No. 61/301,425, filed on Feb. 4, 2010.

(51) Int. Cl.
     *G06K 9/40*      (2006.01)

(52) U.S. Cl.
     USPC ........................................................ 382/264

(58) Field of Classification Search
     USPC ... 348/E13.017, E13.057, E13.067; 345/422; 382/285; 707/E17.124, E17.125
     See application file for complete search history.

(56) References Cited

U.S. PATENT DOCUMENTS

| | | | |
|---|---|---|---|
| 5,751,931 A * | 5/1998 | Cox et al. ....................... | 345/440 |
| 2003/0001861 A1* | 1/2003 | Watson et al. ................. | 345/609 |
| 2008/0137989 A1* | 6/2008 | Ng et al. ........................ | 382/285 |
| 2009/0002368 A1* | 1/2009 | Vitikainen et al. ............ | 345/422 |
| 2009/0060277 A1* | 3/2009 | Zhang et al. .................. | 382/103 |
| 2009/0196492 A1 | 8/2009 | Jung et al. | |
| 2010/0008568 A1 | 1/2010 | Curti et al. | |
| 2011/0187820 A1* | 8/2011 | Gilboa et al. .................. | 348/43 |
| 2011/0285910 A1* | 11/2011 | Bamji et al. .................. | 348/631 |

OTHER PUBLICATIONS

Battiato, S. et al, "Depth-Map Generation by Image Classification", http://citeseerx.ist.psu.edu/viewdoc/download?doi=10.1.1.109. 7959&rep=rep1&type=pdf, dated Apr. 26, 2004, 10 pages.*
Tam, W.J., et al., "3D-TV Content Generation: 2D-to-3D Conversion", Communications Research Centre Canada, ICME 2006, Jul. 9-12, 2006, 2006 IEEE, pp. 1869-1872.

* cited by examiner

*Primary Examiner* — Gregory F Cunningham
(74) *Attorney, Agent, or Firm* — Haverstock & Owens LLP

(57) ABSTRACT

A method for generating a depth map for a 2D image includes receiving the 2D image; analyzing content of the received 2D image; determining a depth map based on a result of the content analysis; refining the determined depth map using an edge-preserving and noise reducing smoothing filter; and providing the refined depth map.

19 Claims, 14 Drawing Sheets

FAST DEPTH MAP GENERATION FOR 2D TO 3D CONVERSION

CROSS REFERENCE TO RELATED PATENT APPLICATIONS

This application is a continuation-in-part of U.S. application Ser. No. 13/019,640, filed on Feb. 2, 2011, titled "2D TO 3D Image Conversion Based on Image Content," which claims the priority and benefit of U.S. Provisional Application No. 61/301,425, filed on Feb. 4, 2010, titled "2D TO 3D Image Conversion Based on Image Categorization," and both of which are incorporated in their entirety by reference herein.

TECHNICAL FIELD

The present disclosure relates to methods and systems for fast generating a depth map that may be used for converting an image in a two-dimensional ("2D") format into an image in a three-dimensional format ("3D").

BACKGROUND

As 3D display technologies such as 3D TVs are now considered as a next major breakthrough in the ultimate visual experience of media, a demand for 3D content is rapidly increasing. The conversion of image data from 2D to 3D, a fast way to obtain 3D content from existing 2D content, has been extensively studied. One of the methods to convert 2D into 3D is to first generate a depth map, and then create left and right eye images from this depth map.

Nevertheless, most conventional 2D-to-3D image conversion technologies utilize the power of machine learning, which requires significant computing resources and processing time. These technologies involve segmenting the 2D image into super-pixels and recognizing each geometric and/or semantic region using information learned from training data, detecting vanishing lines, reconstructing depth information based on the segmentation or vanishing line detection, etc. Some of them also involve complicated high dimensional feature extraction, e.g. 646-dimensional feature vectors. All of these operations require complex computation and significant processing time, consume significant amount of computing resources, and thus are slow. These technologies may not be practical for real-time 2D-to-3D image conversion, especially on low-power computing devices and/or 3D display devices. In addition, many of these technologies only work for a limited range of images, for example, only working for motion pictures (e.g., a video) but not for a single still image.

SUMMARY

The present disclosure includes an exemplary method for generating a depth map for a 2D image. Embodiments of the method include receiving the 2D image, analyzing content of the received 2D image, and determining a depth map based on a result of the content analysis. Embodiments of the method may also include refining the determined depth map using an edge-preserving and noise reducing smoothing filter, and providing the refined depth map.

An exemplary system in accordance with the present disclosure comprises a user device to receive a 2D image and a 2D-to-3D image converter coupled to the user device. The 2D-to-3D image converter analyzes content of the received 2D image, and determines a depth map based on a result of the content analysis. In some embodiments, the 2D-to-3D image converter also refines the determined depth map using an edge-preserving and noise reducing smoothing filter, and provides the refined depth map. In certain embodiments, the 2D-to-3D image converter further generates a 3D image based at least on the provided depth map.

It is to be understood that both the foregoing general description and the following detailed description are exemplary and explanatory only and are not restrictive of the invention, as claimed.

DETAILED DESCRIPTION

Reference will now be made in detail to the exemplary embodiments illustrated in the accompanying drawings. Wherever possible, the same reference numbers will be used throughout the drawings to refer to the same or like parts.

Methods and systems disclosed herein address the above described needs. For example, methods and systems disclosed herein can generate depth maps based on content and simple features of 2D images (e.g., single still images or video frames), by utilizing efficient algorithms with low computational complexity suitable for real-time implementation, even on low-power computing devices and/or 3D display devices.

Figure 1:
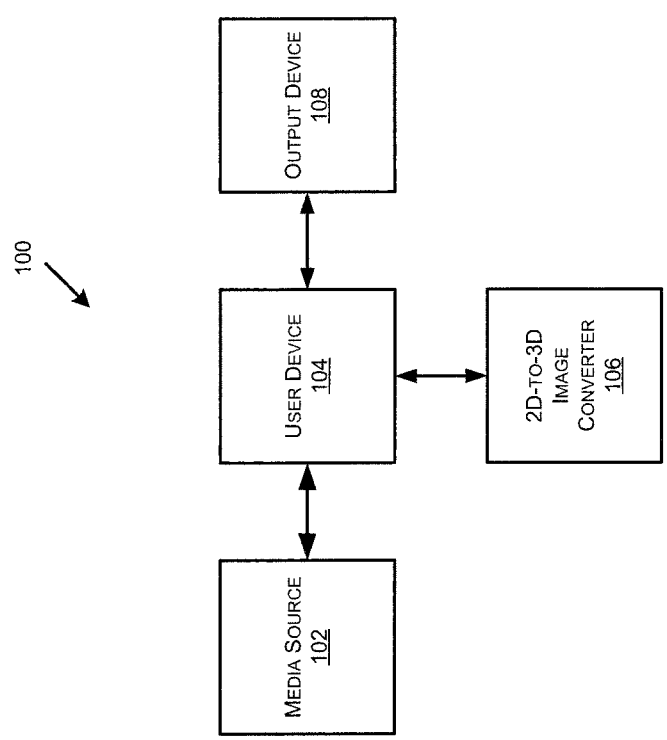
FIG. 1 illustrates a block diagram of an exemplary system consistent with the invention.

FIG. 1 illustrates a block diagram of an exemplary system 100 consistent with the invention. As shown in FIG. 1, exemplary system 100 may comprise a media source 102, a user device 104, a 2D-to-3D image converter 106, and an output device 108. Each of the components is operatively connected to one another via a network or any type of communication links that allow transmission of data from one component to another. The network may include Local Area Networks (LANs) and/or Wide Area Networks (WANs), and may be wireless, wired, or a combination thereof.

Media source 102 can be any type of storage medium capable of storing imaging data, such as video or still images. For example, media source 102 can be provided as a CD, DVD, Blu-ray disc, hard disk, magnetic tape, flash memory card/drive, volatile or non-volatile memory, holographic data storage, and any other type of storage medium. Media source 102 can also be an image capturing device or computer capable of providing imaging data to user device 104. For example, media source 102 can be a camera capturing imaging data and providing the captured imaging data to user device 104.

As another example, media source 102 can be a web server, an enterprise server, or any other type of computer server. Media source 102 can be a computer programmed to accept requests (e.g., HTTP, or other protocols that can initiate data transmission) from user device 104 and to serve user device 104 with requested imaging data. In addition, media source 102 can be a broadcasting facility, such as free-to-air, cable, satellite, and other broadcasting facility, for distributing imaging data.

As further example, media source 102 can be a client computing device. Media source 102 can request a server (e.g., user device 104 or 2D-to-3D image converter 106) in a data network (e.g., a cloud computing network) to convert a 2D image into a 3D image.

User device 104 can be, for example, a computer, a personal digital assistant (PDA), a cell phone or smartphone, a laptop, a desktop, a tablet PC, a media content player, a set-top box, a television set including a broadcast tuner, a video game station/system, or any electronic device capable of providing or rendering imaging data. User device 104 may include software applications that allow user device 104 to communicate with and receive imaging data from a network or local storage medium. As mentioned above, user device 104 can receive data from media source 102, examples of which are provided above.

As another example, user device 104 can be a web server, an enterprise server, or any other type of computer server. User device 104 can be a computer programmed to accept requests (e.g., HTTP, or other protocols that can initiate data transmission) from, e.g., media source 102, for converting an image into a 3D image, and to provide the 3D image generated by 2D-to-3D image converter 106. In addition, user device 104 can be a broadcasting facility, such as free-to-air, cable, satellite, and other broadcasting facility, for distributing imaging data, including imaging data in a 3D format.

As shown in FIG. 1, 2D-to-3D image converter 106 can be implemented as a software program executing in a processor and/or as hardware that performs a 2D-to-3D image conversion based on image content. A 2D image can be one of video frames or still images in a 2D format, can be in color, black/white, or grayscale, and can be in one color space or another color space. In some embodiments, 2D-to-3D image converter 106 can, for example, analyze content of a 2D image, generate a depth map corresponding to the content, and convert the 2D image into a 3D image based on the depth map.

The depth map generation and 2D-to-3D image conversion will be further described below.

Output device 108 can be, for example, a computer, personal digital assistant (PDA), cell phone or smartphone, laptop, desktop, a tablet PC, media content player, set-top box, television set including a broadcast tuner, video game station/system, or any electronic device capable of accessing a data network and/or receiving imaging data. In some embodiments, output device 108 can be a display device such as, for example, a television, monitor, projector, digital photo frame, display panel, or any other display device. In certain embodiments, output device 108 can be a printer.

While shown in FIG. 1 as separate components that are operatively connected, any or all of media source 102, user device 104, 2D-to-3D image converter 106, and output device 108 may be co-located in one device. For example, media source 102 can be located within or form part of user device 104 or output device 108, 2D-to-3D image converter 106 can be located within or form part of media source 102, user device 104, or output device 108, and output device 108 can be located within or form part of user device 104 or media source 102. It is understood that the configuration shown in FIG. 1 is for illustrative purposes only. Certain components or devices may be removed or combined and other components or devices may be added.

Figure 2:
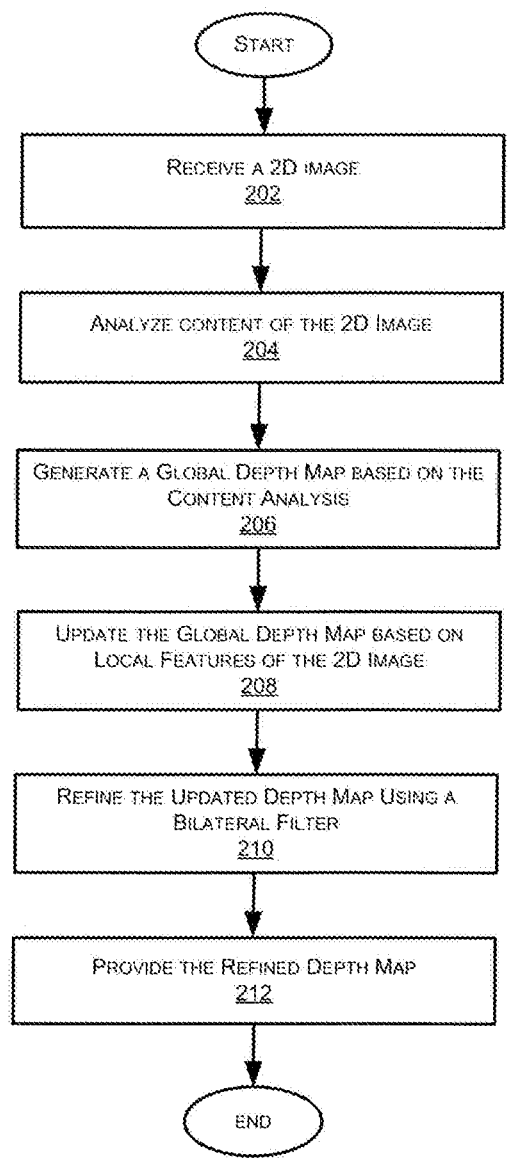
FIG. 2 is a flow chart illustrating an exemplary method for depth map generation based on image content.

FIG. 2 is a flow chart illustrating an exemplary method for depth map generation based on image content. As shown in FIG. 2, a 2D image is received (step 202). Content of the 2D image may be analyzed (step 204). The content analysis may include, for example, image categorization (or classification), and so forth. Based on a result of the content analysis, a corresponding global depth map may be generated, assigned, or determined (step 206). In some embodiments, the global depth map may be updated or refined with one or more local features of the 2D image (step 208). In addition, the global depth map or the updated global depth map may be further refined using an edge-preserving and noise reducing smoothing filter, such as a bilateral filter (step 210). The refined depth map may be provided for generating a 3D image (step 212). In some embodiments, a 3D image may be generated based on the provided depth map.

For example, in some embodiments, a 2D image may be classified into one of image categories (or classes) and/or subcategories (or subclasses) based on content of the image, e.g., one or more visual features of the image. A corresponding global depth map may be determined according to a property of each category/subcategory. In some embodiments, the global depth map may be then refined with one or more simple local features of the image. No image segmentation, vanishing line detection, or complicated feature extraction is required. Only simple operations are involved. Therefore, the methods disclosed herein are fast algorithms with low computational complexity suitable for real time implementation.

Any types and any number of image classifications consistent with disclosed embodiments may be used. Further, depth map generation based on the image classification is just an example of depth map generation based on image content. Other methods consistent with the present disclosure may also be adopted to implement depth map generation based on image content for 2D-to-3D image conversion.

Figure 3A:
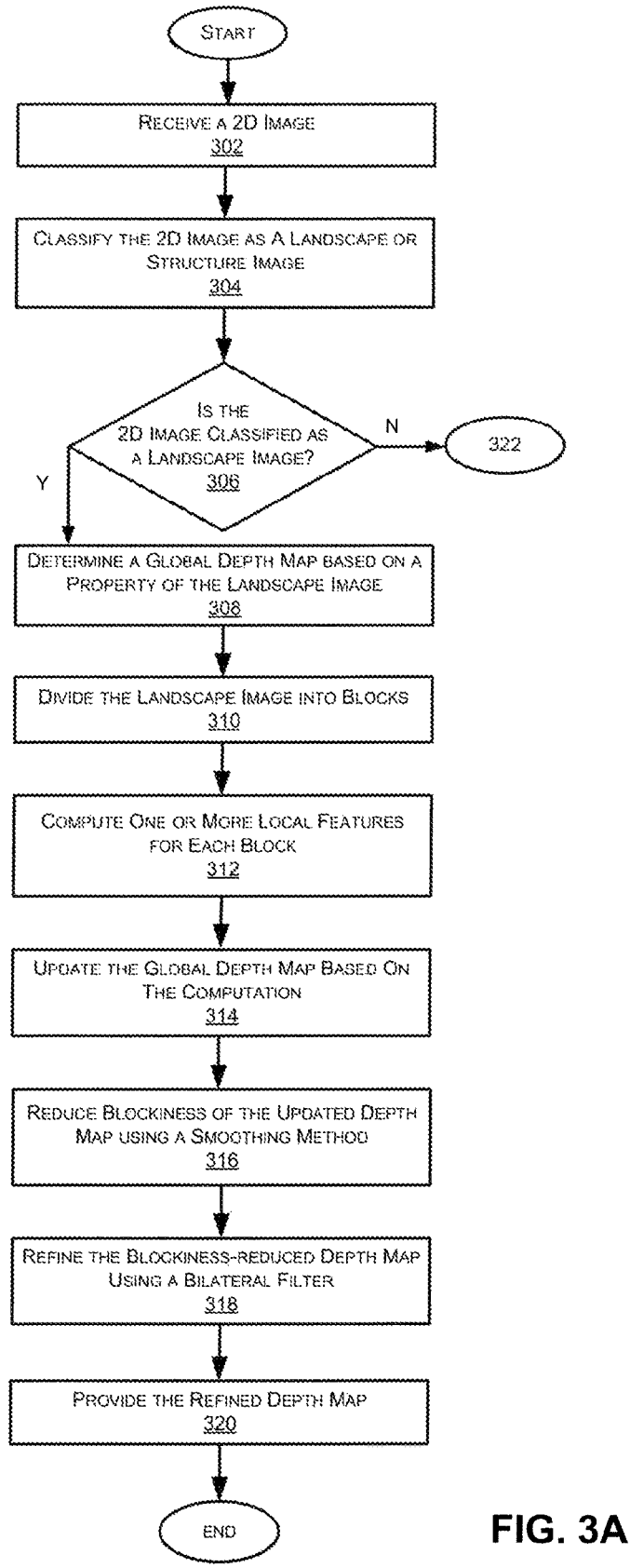
FIG. 3A is a flow chart illustrating an exemplary method for depth map generation based on image categorization.

FIG. 3A is a flow chart illustrating an exemplary method for depth map generation based on image categorization (or classification). Image categorization may be performed to group images into semantically meaningful categories (classes) and/or subcategories (subclasses) based on content of images, e.g., one or more visual features of the images.

In some embodiments, for example, a 2D image may be classified as, e.g., a landscape or structure image. A landscape image may correspond to an image containing natural scenes having vertically changing depths, while a structure image may contain man-made objects such as buildings, roads, room interiors, etc. Therefore, a structure image may have strong vertical and horizontal edges, while a landscape image may tend to have randomly distributed edge directions. Accordingly, the edge direction distribution may be one of visual features to distinguish a landscape image from a structure image. In some embodiments, an edge direction histogram may be employed for image classification. In certain embodiments, various classifiers, e.g., a Gaussian Bayes classifier, may be used to perform the classification based on the edge direction histogram.

With reference to FIG. 3A, a 2D image is received (step 302). Content of the 2D image may be analyzed, and is used to classify the 2D image as one of image categories and/or sub-categories, as described above. In some embodiments, for example, the 2D image may be classified as, e.g., a landscape image or a structure image (step 304), as described above.

For each image category, a different method may be developed or chosen to generate a depth map. The rationale behind this classification is that geometric structures in different categories may be different, and depth assignment can be done in different ways. A depth map may be represented as a grayscale image with an intensity value of each pixel registering its depth. Then, an appropriate disparity between left and right eye images (which is also called parallax) may be calculated from the depth map. Different categories of images in the images may have different image layouts. Accordingly, the method used to reconstruct a depth map may vary with the content of an image. Thus, in some embodiments, depth map generation may be based on an understanding of image content, e.g., image classification (and/or subclassification), and so forth.

Figure 5:
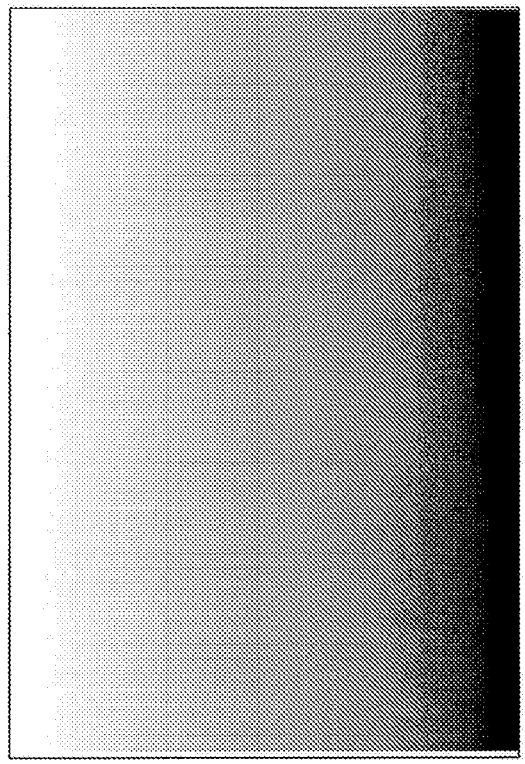
FIG. 5 illustrates an exemplary global depth map for the image of FIG. 4.

Referring back to FIG. 3A, the classification is checked to determine whether the 2D image is classified as a certain category (e.g., a landscape image) (step 306). In some embodiments, based on the image classification, a corresponding approach may be adopted for generating a depth map. For example, if the 2D image is not classified as a landscape image, the method proceeds to step 322, which will be further described with reference to FIG. 3B. Otherwise, if the 2D image is classified as a landscape image, a different method may be adopted for generating a depth map. For example, a gradient depth plane, extending from the bottom of the image to the top of the image, may be determined or assigned as a global depth map based on the property (e.g., natural scenes) of the landscape image (step 308). In the global depth map, the depth increases as reaching from the bottom to the top of the image. For example, FIG. 4 illustrates an exemplary 2D landscape image, and FIG. 5 illustrates an exemplary global depth map for the image of FIG. 4. As shown in FIG. 5, in the global depth map, bright pixels indicate a large depth (a farther location to a viewer) and dark pixels denote a small depth (a closer location to a viewer).

With reference to FIG. 3A, the global depth map may be updated or refined based on one or more local features observed from the landscape image. For example, in some embodiments, the landscape image may be divided into a plurality of blocks (or cells) (step 310). One or more local features (or cues), e.g., haze and/or vertical edges, observed from the landscape image, may be computed for each block (step 312).

Haze is caused by atomspheric scattering of light. In a landscape image, far objects, e.g. far mountains or trees, often suffer more from haze than close objects. So, in many cases, the extent of haze is highly correlated with the depth. In some embodiments, a dark channel value may be used to reflect the extent of haze. The dark channel value for each block may be defined as, for example, $$I^{dark}(x, y) = \min_{c \in [r,g,b]} \left( \min_{(x',y') \in \Omega(x,y)} (I^c(x', y')) \right)$$

where $I^c(x', y')$ denotes the intensity at a pixel location $(x', y')$ in color channel c (one of Red, Green, or Blue color channel), and $\Omega(x, y)$ denotes the neighborhood of the pixel location $(x', y')$. A smaller dark channel value usually means less amount of haze, therefore a smaller depth.

For a landscape image, another local feature or cue for depth information can be vertical edges. The presence of strong vertical edges may indicate a presence of vertical objects. With a same vertical position y, vertical objects may be closer than other objects, such as those lying on a ground support. Therefore a vertical edge can be an important cue for the depth. Different measures may be taken to detect the presence of vertical edges. In some embodiments, a horizontal gradient value may be used to measure a vertical edge due to its easy and fast computation. In some embodiments, the landscape image in color may be first converted into a grayscale image. Then, a horizontal gradient value for each block may be computed and defined as, for example, $$\bar{g}(x, y) = \frac{1}{N} \sum_{(x',y') \in \Omega(x,y)} g(x', y'),$$

where $g(x', y')$ is a horizontal gradient at a pixel location $(x', y')$, $\Omega(x, y)$ is the neighborhood of the pixel location $(x', y')$, and N is the number of pixels in $\Omega(x, y)$.

With reference to FIG. 3A, the global depth map may be updated or refined based on the computed one or more local features, e.g., a dark channel value and/or a horizontal gradient value, for each block (step 314). In some embodiments, for example, the following equation may be used to update the global depth map, $$d(x, y) = d_{global}(x, y) d_{haze}(I^{dark}(x, y)) d_{vertical}(\bar{g}(x, y))$$

where $d_{global}(x, y)$ denotes a global depth value at a pixel location $(x, y)$, $d_{haze}(I^{dark}(x, y))$ is a function of a dark channel value and denotes a factor introduced by the haze cue, $d_{vertical}(\bar{g}(x, y))$ is a function of an average horizontal gradient value and denotes a factor introduced by a vertical edge. The function $d_{haze}(I^{dark}(x, y))$ is a monotonically increasing function of $I^{dark}(x, y)$. The function $d_{vertical}(\bar{g}(x, y))$ is a monotonically decreasing function of $\bar{g}(x, y)$. In some embodiments, a simple approach may be adopted to make these two functions linear. But other functional forms, such as exponential forms, may also be used.

Figure 6:
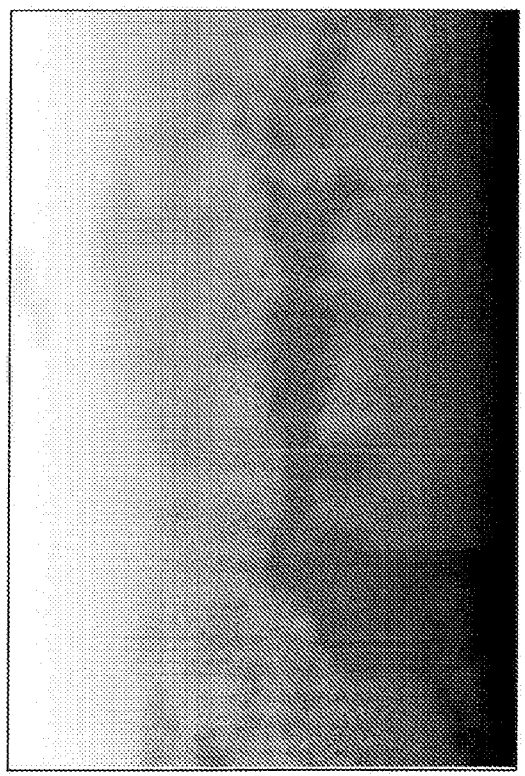
FIG. 6 illustrates an exemplary updated depth map for the image of FIG. 4 based on local features.

Since one or more local features, e.g., a dark channel value and/or an average horizontal gradient value, may be computed over a group of pixels (a neighborhood), the landscape image may be partitioned into blocks, and the depth may be updated or computed for each block, as described above. In some embodiments, a smoothing method, e.g., Gaussian smoothing, may be performed to reduce blockiness of the updated depth map (step 316). FIG. 6 illustrates an exemplary updated depth map for the image of FIG. 4 based on local features and/or blockiness reduction, as described above.

Figure 7:
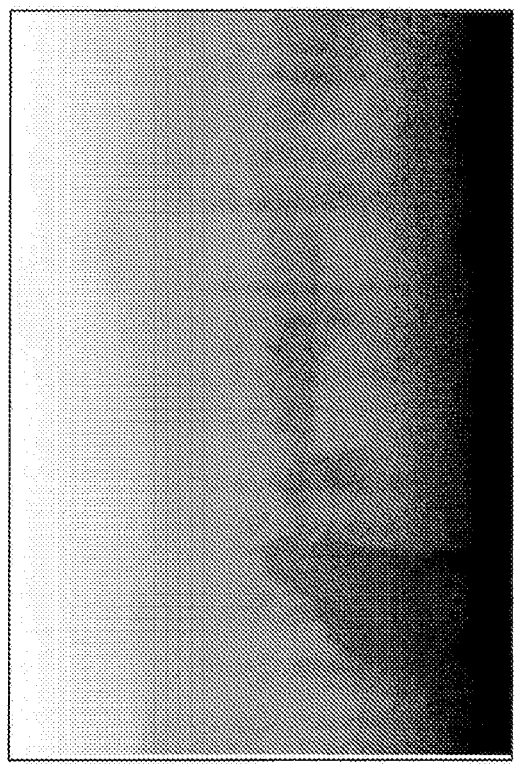
FIG. 7 illustrates an exemplary refined depth map for the image of FIG. 4 based on bilateral filter refinement of the depth map of FIG. 6.
Figure 8:
FIG. 8 illustrates an exemplary resulting 3D image for the image of FIG. 4 based on the depth map in FIG. 7.

Referring back to FIG. 3A, the updated or blockiness-reduced global depth map may be further refined using an edge-preserving and noise reducing smoothing filter, such as a bilateral filter (step 318). The refined depth map may be provided for generating a 3D image (step 320). In some embodiments, a 3D image may be generated based on the provided depth map. For example, FIG. 7 illustrates an exemplary refined depth map for the image of FIG. 4 based on the above-described bilateral filter refinement, and FIG. 8 illustrates an exemplary resulting 3D image for the image of FIG. 4 based on the depth map in FIG. 7.

Figure 3B:
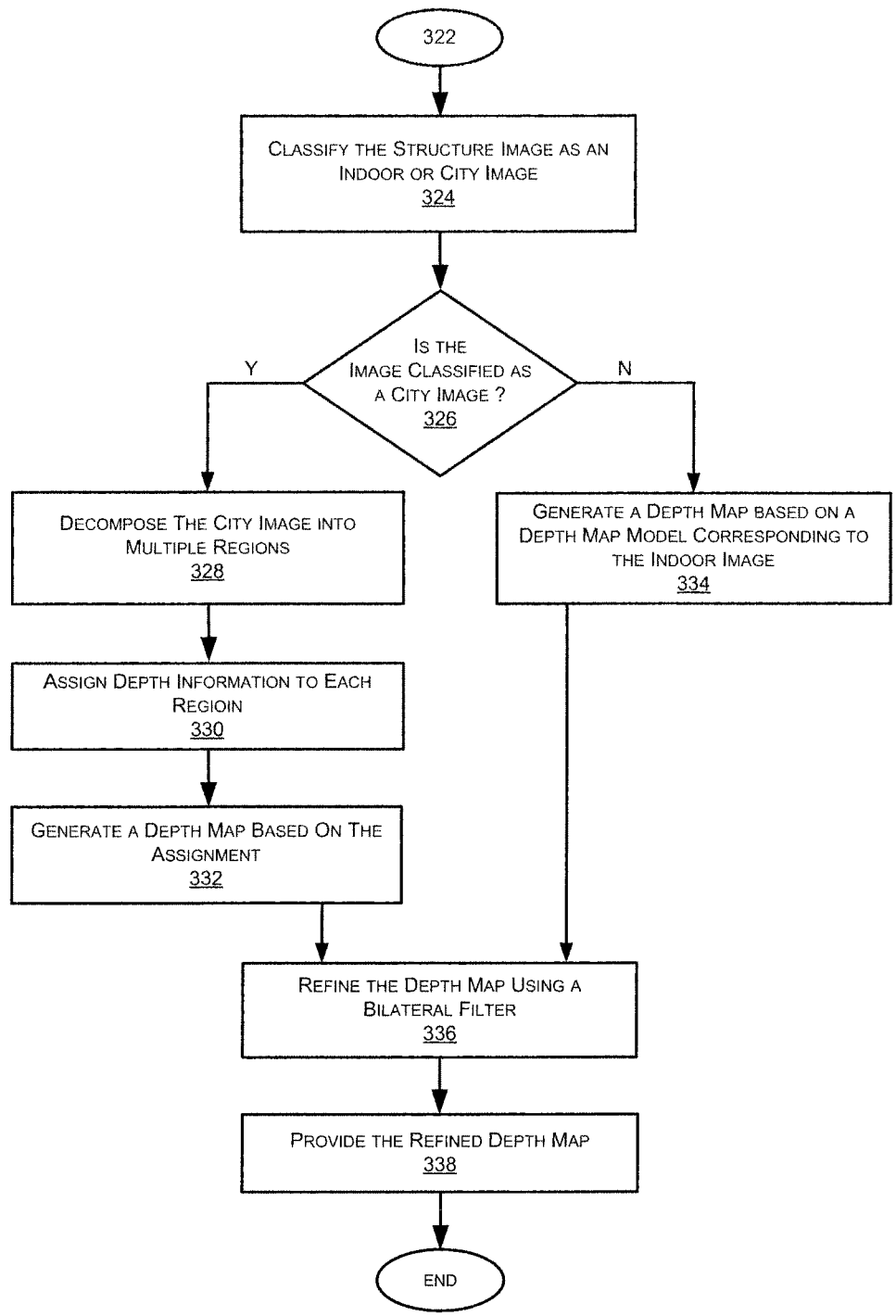
FIG. 3B is a flow chart illustrating another exemplary method for depth map generation based on image categorization.
Figure 4:
FIG. 4 illustrates an exemplary 2D landscape image.

FIG. 3B is a flow chart illustrating another exemplary method for depth map generation based on image categorization. In some embodiments, after a 2D image is classified as one of image categories (or classes), it may be further classified as one of subcategories (or subclasses) of the image categories. For example, in some embodiments, if a 2D image is classified as a structure image, it may be further classified as, e.g., an indoor image or a city image (also called an outdoor image). A city image is a picture taken outside and its main contents are man-made structures, such as buildings, cars, and so forth. A city image tends to have uniform spatial lighting/color distribution. For example, in the city image, a sky may be blue and on a top of the image, while a ground is at a bottom of the image. On the other hand, an indoor image tends to have more varied color distributions. Therefore, in some embodiments, spatial color distribution features may be used to distinguish between an indoor image and a city image. In some embodiments, a color histogram may be employed for the image classification. In certain embodiments, various classifier, e.g., a support vector machine, may be used to perform the classification based on the color histogram.

With reference to FIG. 3B, after a 2D image is classified as one of image categories (or classes), e.g., a structure image (step 322), it may be further classified as one of image subcategories (subclasses), e.g., an indoor or city image (step 324). After the subcategorization (or subclassification), it is determined whether the 2D image is classified as a certain subcategory (e.g., a city image) (step 326). In some embodiments, based on the image subcategorization, a corresponding method may be employed to generate a depth map, which may be used to generate a 3D image.

In some embodiments, if a structure image is subclassified as a city image, the image may be first decomposed into multiple regions (step 328). In certain embodiments, the city image may be decomposed into, e.g., sky, vertical structure, and/or ground regions or areas. In some embodiments, the sky region may be detected based on color and gradient cues, and the vertical structure may be detected based on vertical straight line segments. The rest area may be marked as a ground region.

The sky region (if there exists one) usually stays at the top area in the image, so it may be identified by a simple region growing method. For example, in some embodiments, the city image in a RGB color space may be divided into blocks (or cells). For each column starting from the topmost block, a pixel location (x, y) may be checked to determine whether its blue channel color component b(x,y) is above a blue threshold, e.g, $B_{thr}$, and its gradient value g(x,y) is below a gradient threshold, e.g., $G_{thr}$. The blue threshold and the gradient threshold may be determined empirically or configured by a user. If a pixel location is no longer bluerish (e.g., b(x, y)<$B_{thr}$) or it is on a strong edge (e.g., g(x, y)>$G_{thr}$), then the sky region expansion stops for that column, otherwise, it will continue downward. After roughly identifying the sky region, its boundary may be smoothed by a spatial filter.

After identifying the sky region, the region beneath (or rest of picture) is divided into a vertical structure region and a ground region. As vertical structures usually present long and strong edges, this feature may be employed to identify vertical structures. In some embodiments, for every pixel location (x, y), its horizontal and vertical gradient, e.g., h(x,y) and v(x, y), respectively, may be calculated. If h(x, y)>s*v(x, y) and h(x, y)>$H_{thr}$ (where s and $H_{thr}$ are thresholds determined empirically or configured by a user, and s>1), then the pixel location (x,y) is marked as a vertical edge pixel. By calculating connectivity of marked vertical edge pixels in each column, long vertical edges may be detected as well as their low end points. Assume n vertical edges are detected and coordinates of their low end points are $(x_i, y_i)$ (where i=1, 2, . . . , n), a parabola may be formed connecting the low end points $(x_i, y_i)$ using least squares and serve as a partition line between a vertical structure region and a ground region.

Referring back to FIG. 3B, after decomposing or dividing the city image into multiple regions, depth information may be assigned to each region (step 330). In some embodiments, for example, each region's depth may be assigned as follows. For the sky region, the depth for each pixel location (x, y) may be assigned as, for example, $$d(x, y) = s_1 y^2 + s_2 y + s_3,$$

where $s_1$, $s_2$, and $s_3$ are parameters, determined empirically or configured by a user, to ensure that a top portion of the sky region appear closer than its bottom portion. The parameters $s_1$, $s_2$, $s_3$ may also ensure that the overall range of the depth map be constrained within a user's comfortable view range.

For the ground region, the depth for each pixel location (x, y) may be assigned as, for example, $$d(x, y) = g_1 y^2 + g_2 y + g_3$$

where $g_1$, $g_2$, and $g_3$ are parameters, determined empirically or configured by a user, to ensure that a bottom portion of the ground region appear closer than its top portion. The parameters $g_1$, $g_2$, $g_3$ may also ensure that the overall range of the depth map be constrained within a user's comfortable view range.

For the vertical structure region, the depth for each pixel location (x, y) may be assigned as, for example, $$d(x, y) = d(x, y_0)$$

where (x, $y_0$) is the division point between a vertical structure and a ground at column x, i.e., the vertical structure stands on the ground.

Figure 9:
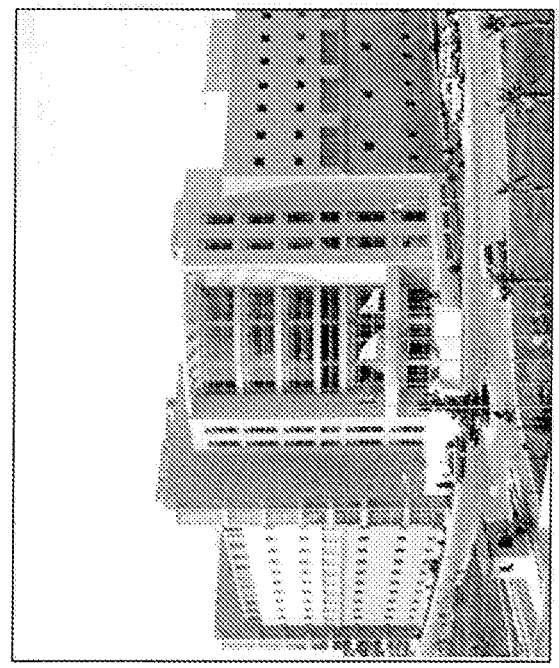
FIG. 9 illustrates an exemplary 2D city image.
Figure 10:
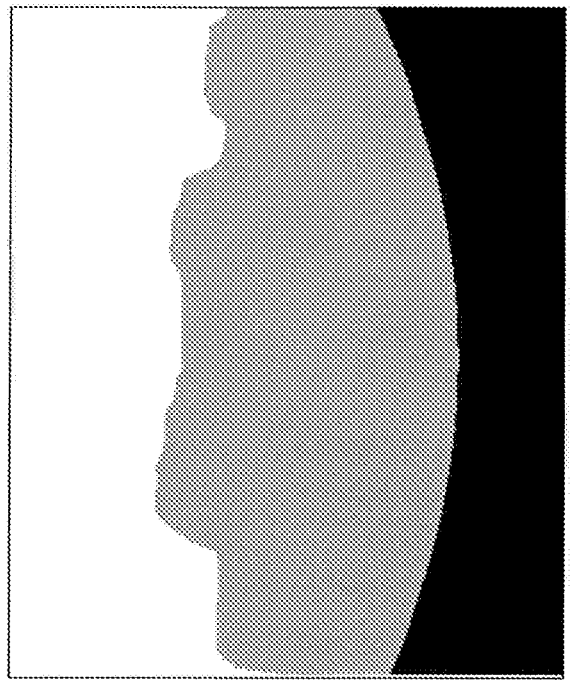
FIG. 10 illustrates an exemplary region map for the image of FIG. 9.
Figure 11:
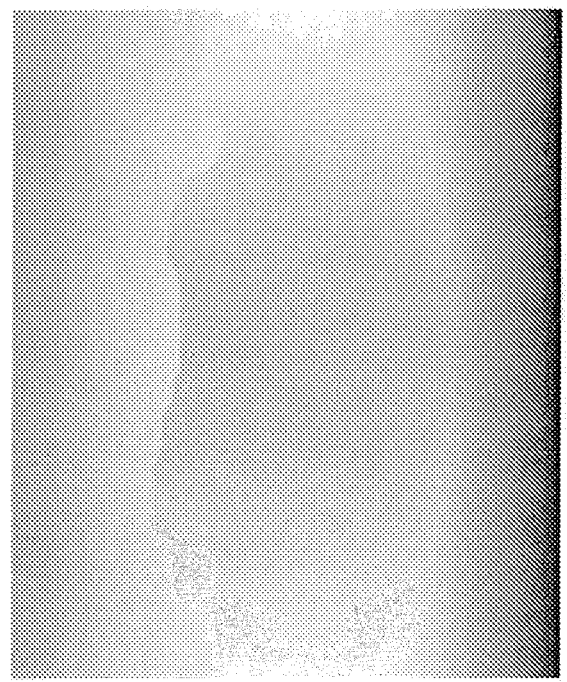
FIG. 11 illustrates an exemplary depth map for the image of FIG. 9.

For example, FIG. 9 illustrates an exemplary 2D city image, and FIG. 10 illustrates an exemplary resulting region map for the image of FIG. 9, based on the above-described region division method. As shown in FIG. 10, white pixels indicate a sky region, black pixels indicate a ground region, and gray pixels indicate a vertical structure. FIG. 11 illustrates an exemplary resulting depth map for the image of FIG. 9 using the above-described depth assignment methods. As shown in FIG. 11, the ground plane's depth extends or increases from its bottom location to top, while the sky's depth is assigned in a reverse way, and the vertical structure stands straight on the ground.

The above depth assignment methods for city images are simple and appear natural to a human visual system, but are just examples. Other depth generation and/or assignment methods may also be applied.

Referring back to FIG. 3B, in some embodiments, a structure image may be subclassified as an indoor image. An indoor image refers to a picture taken inside a building. A depth map may be determined, generated, or assigned based a depth map model corresponding to the indoor image (step 334). The 3D structure of an indoor image may resemble a closed box with cluttered objects. In some embodiments, a sphere-like shape global depth map may be used to simulate a structure of an indoor image. Also, other shapes, e.g., parabola, cylinder, etc, may also be used to determine, generate, or assign a depth map for an indoor image. For example, in certain embodiments, a parabolic shape global map may be adopted due to its computing efficiency. For a parabolic shape, the depth for each pixel location (x, y) in an indoor image may be computed using a formula, for example, $$d(x, y) = a*((x-x_0)^2 + (y-y_0)^2) + k$$

where (x0, y0) is an image center, and a and k are parameters determined empirically or configured by a user to ensure that the shape is concave and within a user's comfortable viewing range.

Figure 12:
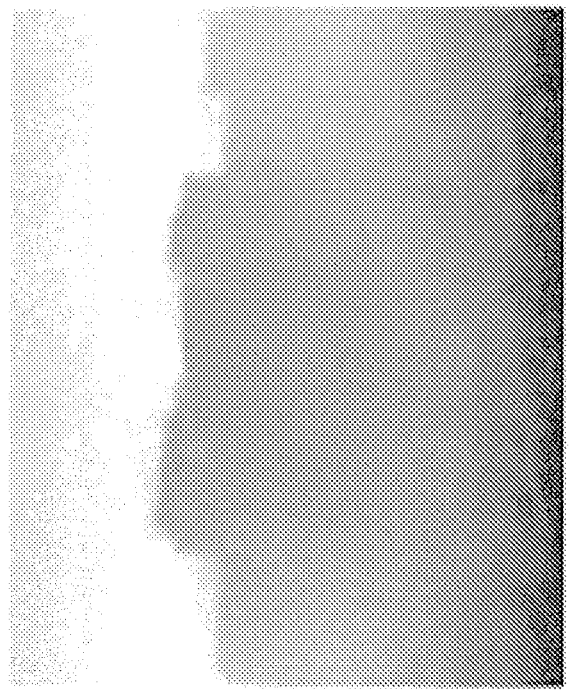
FIG. 12 illustrates an exemplary refined depth map for the image of FIG. 9 based on bilateral filter refinement of the depth map of FIG. 11.
Figure 13:
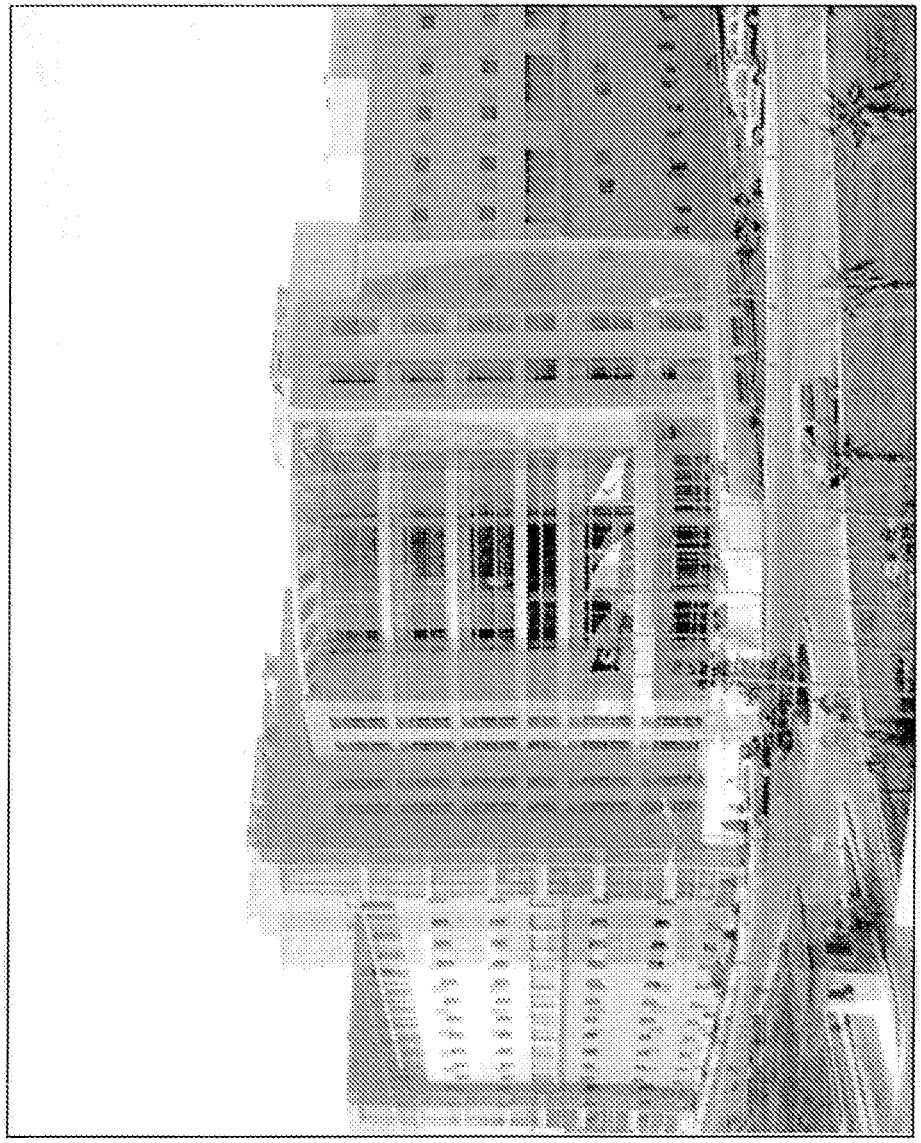
FIG. 13 illustrates an exemplary resulting 3D image for the image of FIG. 9 based on the depth map in FIG. 12.

With reference to FIG. 3B, after a depth map is generated for an image subclass, e.g., a city image or an indoor image, the depth map may be further refined using an edge-preserving and noise reducing smoothing filter, such as a bilateral filter (step 336). The refined depth map may be provided for generating a 3D image (step 338). In some embodiments, a 3D image may be generated based on the provided depth map. For example, FIG. 12 illustrates an exemplary refined depth map for the city image of FIG. 9 based on bilateral filter refinement of the depth map of FIG. 11, as described above, and FIG. 13 illustrates an exemplary resulting 3D image for the image of FIG. 9 based on the depth map in FIG. 12.

Figure 15:
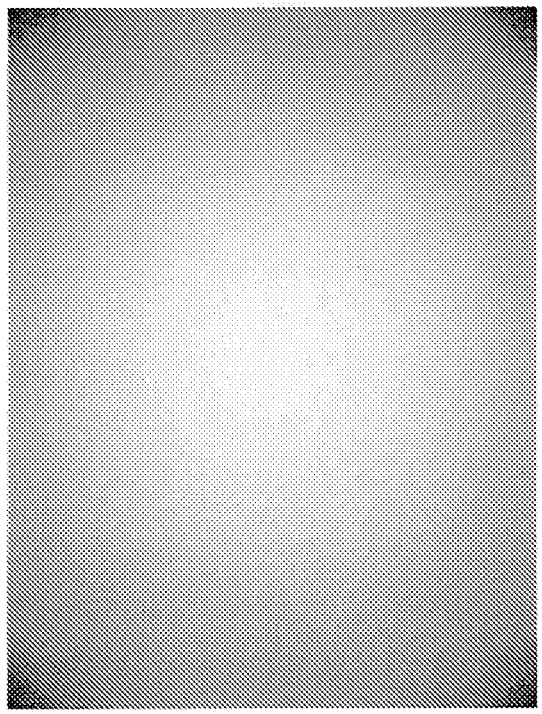
FIG. 15 illustrates an exemplary global depth map for the image of FIG. 14.
Figure 14:
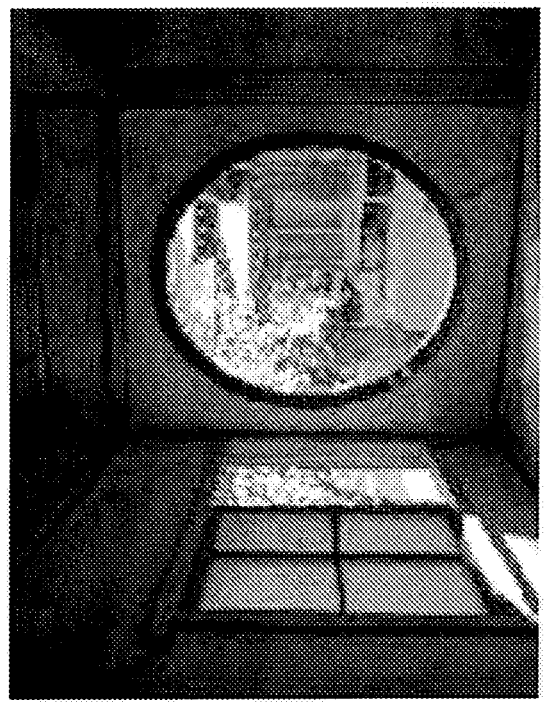
FIG. 14 illustrates an exemplary 2D indoor image.
Figure 16:
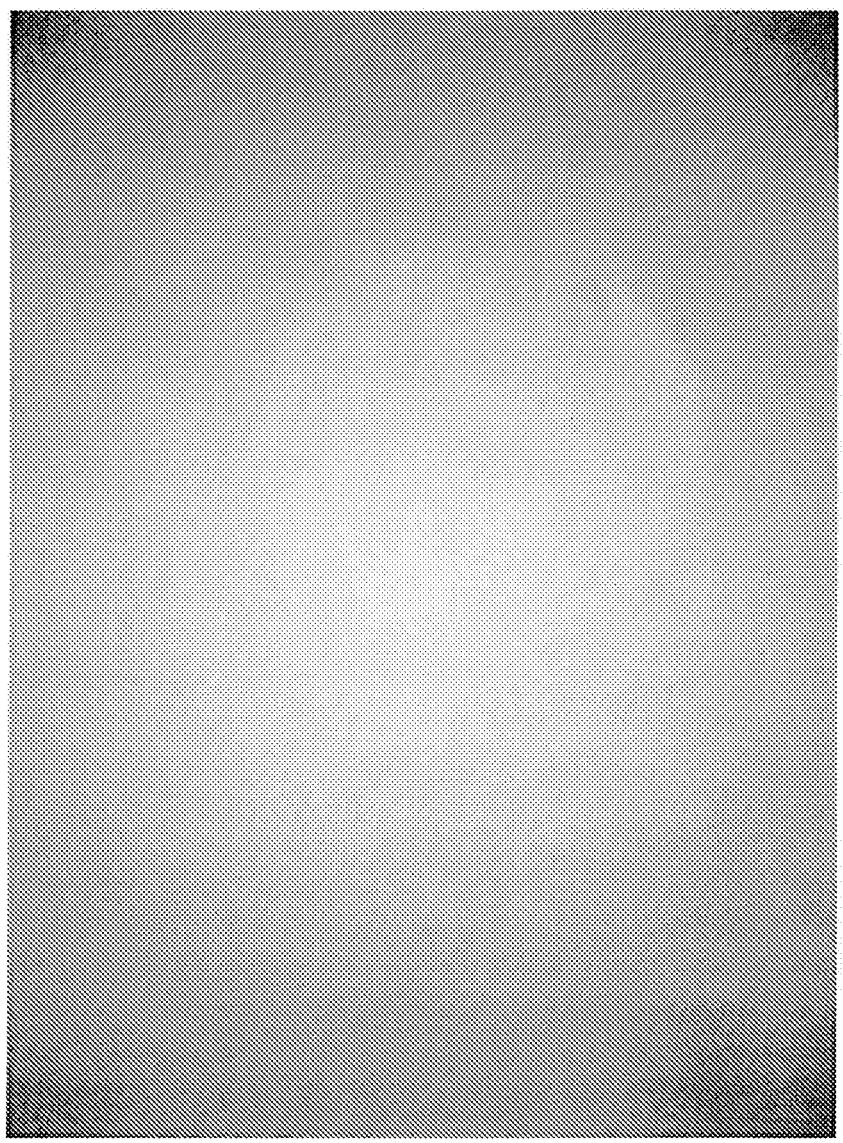
FIG. 16 illustrates an exemplary refined depth map for the image of FIG. 14 based on bilateral filter refinement of the depth map of FIG. 15.
Figure 17:
FIG. 17 illustrates an exemplary resulting 3D image for the image of FIG. 14 based on the depth map in FIG. 16.

For further example, FIG. 14 illustrates an exemplary 2D indoor image, and FIG. 15 illustrates an exemplary global depth map for the image of FIG. 14. As shown in FIG. 15, in the global depth map, bright pixels indicate a large depth (a farther location to a viewer) and dark pixels denote a small depth (a closer location to a viewer). FIG. 16 illustrates an exemplary refined depth map for the image of FIG. 14 based on bilateral filter refinement, as described above. FIG. 17 illustrates an exemplary resulting 3D image for the image of FIG. 14 based on the depth map in FIG. 16.

The classes/subclasses of landscape, city, and indoor images are just exemplary image classifications. Any types and any number of image classifications consistent with disclosed embodiments may also be used. The number of image classes/subclasses may be expanded within disclosed framework, so that higher quality depth maps may be generated for more and more images having different contents.

It is understood that the above-described exemplary process flows in FIGS. 2-3B are for illustrative purposes only. Certain steps may be deleted, combined, or rearranged, and additional steps may be added.

Figure 18:
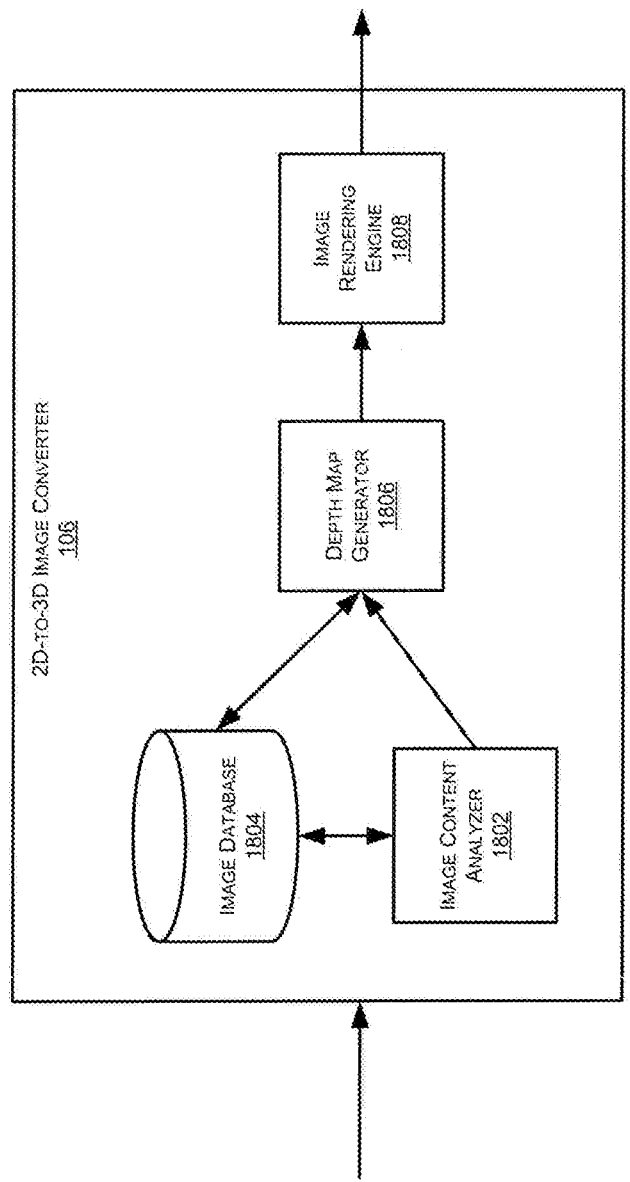
FIG. 18 is a block diagram illustrating an exemplary 2D-to-3D image converter 106 in the exemplary system 100 of FIG. 1.

FIG. 18 is a block diagram illustrating an exemplary 2D-to-3D image converter 106 in the exemplary system 100 of FIG. 1. In some embodiments, 2D-to-3D image converter 106 may include, for example, an image content analyzer 1802, a depth map generator 1806, and an image rendering engine 1808. In certain embodiments, 2D-to-3D image converter 106 may also include an image database 1804.

It is understood that components of 2D-to-3D image converter 106 shown in FIG. 18 are for illustrative purposes only. Certain components may be removed or combined and other components may be added. Also, one or more of the components depicted in FIG. 18 may be implemented in software on one or more computing systems. For example, such components may comprise one or more software applications, which may comprise one or more computer units including storage devices containing computer-readable instructions which, when executed by a processor, cause a computer to perform steps of a method. Computer-readable instructions may be stored on a tangible non-transitory computer-readable medium, such as a solid-state memory or disk memory. Alternatively, one or more of the components depicted in FIG. 18 may be implemented in hardware components or combinations of hardware and software such as, for example, ASICs, special purpose computers, or general purpose computers.

With reference to FIG. 18, 2D-to-3D image converter 106 receives a 2D image, e.g., a still image or a frame of a video. Image content analyzer 1802 may analyze content of the 2D image, as described above. The content analysis may include, for example, image categorization (and/or subcategorization) and so forth, as presented above.

Image database 1804 may be used for storing a collection of data related to depth map generation for 2D-to-3D image conversion. The storage may be organized as a set of queues, a structured file, a flat file, a relational database, an object-oriented database, or any other appropriate database. Computer software, such as a database management system, may be utilized to manage and provide access to the data stored in image database 1804. Image database 1804 may store, among other things, configuration information for image content analysis, configuration information for depth map generation methods corresponding to content of images, configuration information for generating 3D images based on depth maps, etc.

The configuration information for image content analysis may include but is not limited to, for example, image classes/subclasses, and/or methods for the above-described image categorization/subcategorization, or any other type of image content analysis. The configuration information for depth map generation methods may include but is not limited to, for example, methods for generating depth information based on results of content analysis (e.g., image categorization/subcategorization), as described above, or depth models such as a simple sphere model or any other more sophisticated 3D depth model corresponding to image content, and so forth.

With reference to FIG. 18, image analyzer 1802 analyzes content of the 2D image, as described above, based on the configuration information for image content analysis, which may be acquired from, e.g., image database 1804. Image analyzer 1802 passes the analysis result to depth map generator 1806, which determines or chooses from, e.g., image database 1804, a corresponding method for generating a depth map based on the analysis result, as described above. Depth map generator 1806 may employ the chosen method to generate a depth map, as described above. In some embodiments, depth map generator 1806 may determine or choose from, e.g., image database 1804, a global depth map model corresponding to the content of the 2D image. Depth map generator 1806 may generate a depth map based on the global depth map model, as described above.

Based on the generated or determined depth map and the 2D image, image rendering engine 1808 may create a 3D image, according to configuration information acquired from, e.g., image database 1804, as previously presented. After the 3D image is generated, image rendering engine 1808 may render the 3D image for output, e.g., display, printing, etc.

In some embodiments, during the above-described depth map generation and 2D-to-3D image conversion, each component of 2D-to-3D image converter 106 may store its computation/determination results in image database 1804 for later retrieval or training purpose. Based on the historic data, 2D-to-3D image converter 106 may train itself for improved performance.

The methods disclosed herein may be implemented as a computer program product, i.e., a computer program tangibly embodied in a non-transitory information carrier, e.g., in a machine-readable storage device, or a tangible non-transitory computer-readable medium, for execution by, or to control the operation of, data processing apparatus, e.g., a programmable processor, a computer, or multiple computers. A computer program may be written in any form of programming language, including compiled or interpreted languages, and it may be deployed in any form, including as a standalone program or as a module, component, subroutine, or other unit suitable for use in a computing environment. A computer program may be deployed to be executed on one computer or on multiple computers at one site or distributed across multiple sites and interconnected by a communication network.

A portion or all of the methods disclosed herein may also be implemented by an application-specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing unit (CPU) chip, a CPU chip combined on a motherboard, a general purpose computer, or any other combination of devices or modules capable of performing depth map generation for 2D-to-3D image conversion based on image content disclosed herein.

In the preceding specification, the invention has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments of the invention may be apparent to those skilled in the art from consideration of the specification and practice of the invention disclosed herein.

What is claimed is:

1. A computer-implemented method for generating a depth map for a 2D image, the method comprising:
   receiving the 2D image;
   analyzing content of the received 2D image, wherein analyzing the content of the received 2D image comprises:
      acquiring a first set of visual features from the received 2D image; and
      classifying the received 2D image as one of a plurality of image categories based on the acquired first set of visual features;
   determining a depth map based on a result of the content analysis;
   refining the determined depth map using an edge-preserving and noise reducing smoothing filter; and
   providing the refined depth map.

2. The method of claim 1, wherein determining a depth map based on a result of the content analysis comprises:
   determining the depth map based on a property of one of image categories.

3. The method of claim 1, further comprising:
   acquiring a second set of visual features from the received 2D image; and
   further classifying the received 2D image as a subcategory of the one image category based on the acquired second set of visual features.

4. The method of claim 3, wherein determining a depth map based on a result of the content analysis comprises:
   determining the depth map based on a property of the subcategory.

5. The method of claim 1, further comprising:
   computing one or more local features of the received 2D image; and
   updating the determined depth map based on the computed one or more local features.

6. The method of claim 5, wherein computing one or more local features from the received 2D image comprises:
   dividing the received 2D image into a plurality of blocks; and
   computing the one or more local features for each of the plurality of blocks.

7. The method of claim 6, wherein computing the one or more local features for each of the plurality of blocks comprises:
   computing at least one of a dark channel value or a horizontal gradient value for the each of the plurality of blocks.

8. The method of claim 6, further comprising:
   reducing blockiness of the updated depth map by performing a smoothing method.

9. The method of claim 5, wherein refining the determined depth map using an edge preserving and noise reducing smoothing filter comprises:
   refining the updated depth map using an edge-preserving and noise reducing smoothing filter.

10. The method of claim 1, further comprising:
    decomposing the received 2D image into a plurality of regions based on one or more visual features;
    assigning depth information to each of the plurality of regions; and
    determining the depth map based on the assignment.

11. The method of claim 10, wherein decomposing the received 2D image into a plurality of regions based on one or more visual features comprises:
    decomposing the received 2D image into the plurality of regions comprising a sky region, a ground region, or a vertical structure region, based on one or more visual features comprising a color, an edge, a horizontal gradient value, or a vertical gradient value.

12. The method of claim 11, wherein assigning depth information to each of the plurality of regions comprises:
    assigning a first depth plane to the sky region, wherein a depth in the first depth plane increases as reaching from a top to a bottom of the first depth plane;
    assigning a second depth plane to the ground region, wherein a depth in the second depth plane increases as reaching from a bottom to a top of the second depth plane; or
    assigning a third depth plane to the vertical structure region, wherein the third depth plane stands straight on the ground region.

13. The method of claim 1, wherein determining a depth map based on a result of the content analysis comprises:
    determining the depth map based on a global depth model corresponding to the received 2D image.

14. The method of claim 1, wherein refining the determined depth map comprises:
    refining the determined depth map using a bilateral filter.

15. The method of claim 1, further comprising:
    generating a 3D image based at least on the provided depth map.

16. An apparatus for generating a depth map for a 2D image, the apparatus comprising:
    an image content analyzer to analyze content of the received 2D image, wherein analyzing the content of the received 2D image comprises:

acquiring a first set of visual features from the received 2D image; and classifying the received 2D image as one of a plurality of image categories based on the acquired first set of visual features; and a depth map generator to determine a depth map based on a result of the content analysis, and refine the determined depth map using an edge-preserving and noise reducing smoothing filter.

17. The apparatus of claim 16, further comprising:

an image rendering engine to generate a 3D image based at least on the refined depth map.

18. The apparatus of claim 16, further comprising:

an image database to store configuration information for the content analysis, or configuration information for depth map generation methods corresponding to the content of the 2D image.

19. A non-transitory computer-readable medium storing instructions that, when executed, cause a computer to perform a method for generating a depth map for a 2D image, the method comprising:

receiving the 2D image;

analyzing content of the received 2D image, wherein analyzing the content of the received 2D image comprises:

acquiring a first set of visual features from the received 2D image; and classifying the received 2D image as one of a plurality of image categories based on the acquired first set of visual features;

determining a depth map based on a result of the content analysis;

refining the determined depth map using an edge-preserving and noise reducing smoothing filter; and providing the refined depth map.

* * * * *